(12) United States Patent
Takafuji et al.

(10) Patent No.: US 7,768,381 B2
(45) Date of Patent: Aug. 3, 2010

(54) VEHICULAR COLLISION DETECTION APPARATUS

(75) Inventors: Tetsuya Takafuji, Anjo (JP); Shuji Nakamura, Gifu (JP)

(73) Assignee: Denso Corporation, Kariya (JP)

( * ) Notice: Subject to any disclaimer, the term of this patent is extended or adjusted under 35 U.S.C. 154(b) by 280 days.

(21) Appl. No.: 12/214,158

(22) Filed: Jun. 17, 2008

(65) Prior Publication Data

US 2008/0315598 A1 Dec. 25, 2008

(30) Foreign Application Priority Data

Jun. 21, 2007 (JP) .............................. 2007-163943

(51) Int. Cl.
*B60Q 1/00* (2006.01)
(52) U.S. Cl. .................. 340/436; 340/435; 340/438; 340/441; 340/443; 340/454; 340/459; 293/117; 293/107; 293/133; 73/12.01; 73/865.3; 73/866.2; 296/187.03; 296/187.04; 296/187.06; 701/45; 701/96; 701/301
(58) Field of Classification Search ............... 340/436, 340/435, 438, 441, 443, 454, 459; 293/117, 293/107, 133; 73/12.01, 865.3, 866.6; 296/187.03, 296/187.04, 187.06; 701/45, 96, 301
See application file for complete search history.

(56) References Cited

U.S. PATENT DOCUMENTS

2006/0087417 A1* 4/2006 Kiribayashi ................. 340/435
2007/0181359 A1* 8/2007 Mader ......................... 180/274
2008/0098821 A1* 5/2008 Tanabe ........................ 73/775

FOREIGN PATENT DOCUMENTS

| JP | 07-017341 | 1/1995 |
| JP | 2006-117157 | 5/2006 |
| JP | 2007-290689 | 11/2007 |
| WO | WO 2005/098384 | 10/2005 |

\* cited by examiner

*Primary Examiner*—Tai T Nguyen
(74) *Attorney, Agent, or Firm*—Harness, Dickey & Pierce, PLC

(57) ABSTRACT

A collision detection apparatus for a vehicle having a vehicle bumper, which includes a bumper reinforcement includes a chamber member, a pressure sensor, and a collision detecting device. The chamber member is provided inside the vehicle bumper at a front surface of the bumper reinforcement. The pressure sensor is configured to sense change of pressure in the chamber space. The chamber member includes a deformable part and a non-deformable part, each of which extends in a vehicle width direction. The deformable part is compressed to be deformed between the collision object and the bumper reinforcement in a case, where the collision object collides with the vehicle bumper. The non-deformable part is limited from being compressed to be deformed.

13 Claims, 3 Drawing Sheets

VEHICULAR COLLISION DETECTION APPARATUS

CROSS REFERENCE TO RELATED APPLICATION

This application is based on and incorporates herein by reference Japanese Patent Application No. 2007-163943 filed on Jun. 21, 2007.

BACKGROUND OF THE INVENTION

1. Field of the Invention

The present invention relates generally to a vehicular collision detection apparatus that detects collision of an object, such as a pedestrian, with a vehicle bumper.

2. Description of Related Art

Recently, there has been suggested a technique that includes an obstacle determination device mounted on a vehicle bumper member for the purpose of protecting a pedestrian. In the above technique, when the vehicle collision occurs, it is determined whether the collision object is a pedestrian. If it is determined that the object is the pedestrian, a protection device for protecting the pedestrian (for example, an active hood, a air bag on a cowling) is activated. An actual use of the above technique has been also studied.

In other words, in a case, where the protection apparatus (for example, the active hood) mounted on a hood is activated when the collision obstacle is not the pedestrian, various adverse influences may occur disadvantageously. For example, if the collision with a light-weighted fallen object, such as a traffic cone and a construction signboard, is not distinguished from the collision with the pedestrian, the protection apparatus may be uselessly activated, thereby generating unnecessary repair expenses. Also, in a case, where the collision with a heavy-weight fixed object, such as a concrete wall, a vehicle, is not distinguished from the collision with the pedestrian, the hood may be displaced backward while the hood is lifted, and thereby the hood may enter into a passenger compartment. Thus, the hood may damage the occupant. As above, because it has become required to accurately determine whether the obstacle is a pedestrian, there is proposed a conventional vehicular collision detection apparatus that includes a chamber member provided in a vehicle bumper at a front side of a bumper reinforcement. In the above configuration, the vehicular collision detection apparatus uses a pressure sensor for sensing a change of pressure in a chamber space in order to detect the collision of an object, such as a pedestrian, with the vehicle bumper (see, for example, WO 2005/098384 corresponding to US 2007-0181359, JP-A-2006-117157 corresponding to US2006-0087417).

However, in the above vehicular collision detection apparatus, in a case, where multiple pedestrians simultaneously collide with the vehicle or where the pedestrian and another object other than the pedestrian (for example, a utility pole, a garden tree) simultaneously collide with the vehicle, the collision of the pedestrian may not be accurately detected. For example, there may be occasions, where the utility pole collides with a part of the chamber member located between the pressure sensor and the pedestrian, and thereby the chamber member may completely collapse due to the collision with the utility pole. In the above occasions, the communication of air in the chamber member between the pressure sensor and the pedestrian may be disabled. As a result, the change of pressure due to the pedestrian collision is not transmitted to the pressure sensor, and thereby the collision of the pedestrian may not be detected disadvantageously.

SUMMARY OF THE INVENTION

The present invention is made in view of the above disadvantages. Thus, it is an objective of the present invention to address at least one of the above disadvantages.

According to one aspect of the present invention, there is provided a collision detection apparatus for a vehicle having a vehicle bumper, which includes a bumper reinforcement. The collision detection apparatus includes a chamber member, a pressure sensor, and a collision detecting device. The chamber member is provided inside the vehicle bumper at a front surface of the bumper reinforcement and the chamber member has a chamber space therein. The pressure sensor is configured to sense change of pressure in the chamber space. The collision detecting device detects collision of a collision object with the vehicle bumper based on a detection result by the pressure sensor. The chamber member includes a deformable part and a non-deformable part, each of which extends in a vehicle width direction. The deformable part and the non-deformable part integrally define the chamber space. The deformable part is compressed to be deformed between the collision object and the bumper reinforcement in a case, where the collision object collides with the vehicle bumper. The non-deformable part is limited from being compressed to be deformed between the collision object and the bumper reinforcement.

According to another aspect of the present invention, there is also provided a collision detection apparatus for detecting collision of a collision object with a vehicle having a bumper cover and a bumper reinforcement. The collision detection apparatus includes a chamber member, a pressure sensor, and a collision detecting device. The chamber member is provided between the bumper cover and the bumper reinforcement along a longitudinal axis of the vehicle. The pressure sensor is configured to sense pressure in the chamber member. The collision detecting device detects collision of the collision object with the bumper cover based on the pressure sensed by the pressure sensor. The chamber member includes a deformable part and a non-deformable part, each of which extends along a transverse axis of the vehicle. The deformable part is deformable along the longitudinal axis. The non-deformable part is limited from being deformed along the longitudinal axis.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

Figure 1:
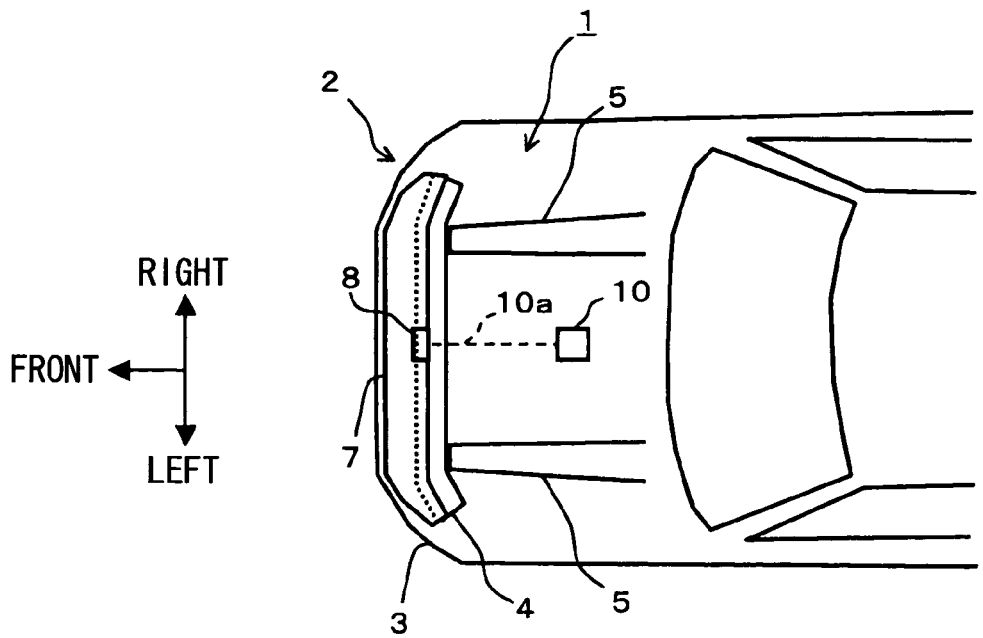
FIG. 1 is a plan view illustrating an inside of a vehicle bumper that is provided with a vehicular collision detection apparatus of one embodiment of the present invention.

A vehicular collision detection apparatus of one embodiment of the present invention is described with reference to accompanying drawings. FIG. 1 a plan view schematically illustrating a vehicular collision detection apparatus 1 of the one embodiment of the present invention, and FIG. 2 is a side view illustrating the vehicular collision detection apparatus 1.

Figure 2:
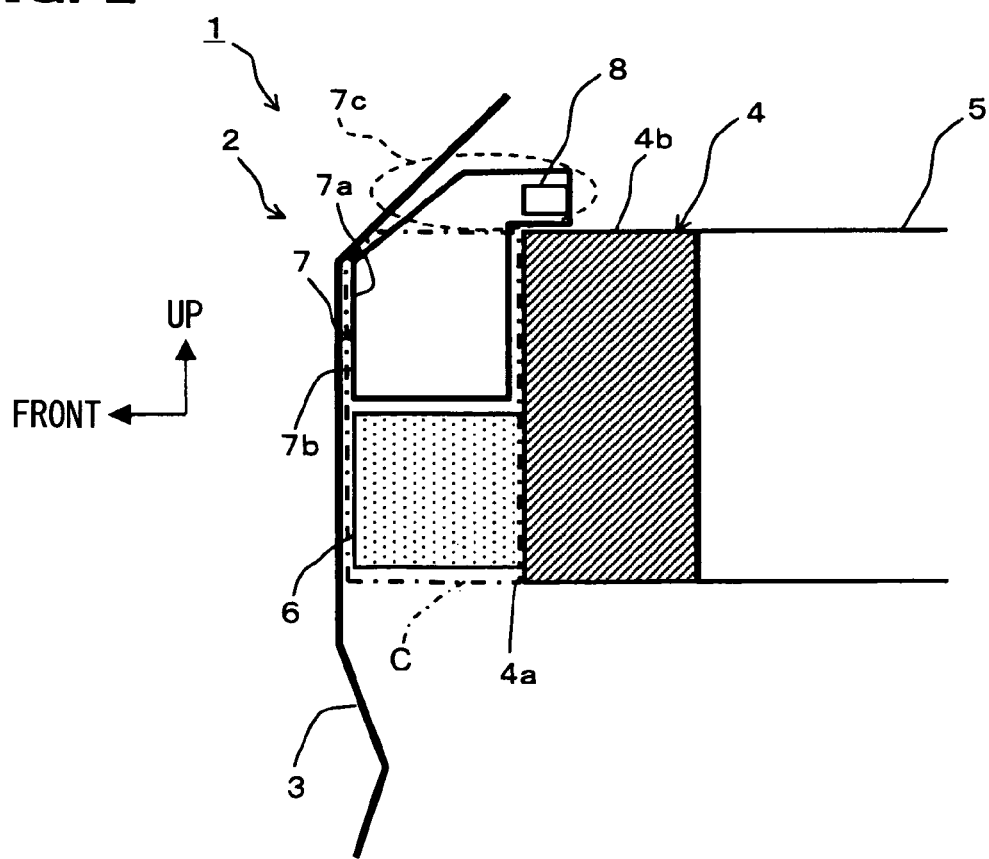
FIG. 2 is a side view illustrating the inside of the vehicle bumper provided with the vehicular collision detection apparatus of the one embodiment.

The vehicular collision detection apparatus 1 of the present embodiment mainly includes a chamber member 7, a pressure sensor 8, and a pedestrian protection apparatus electronic control unit (ECU) 10 as shown in FIGS. 1 and 2. The above chamber member 7 is provided inside a vehicle bumper 2.

The vehicle bumper 2 mainly includes a bumper cover 3, a bumper reinforcement 4, side members 5, an absorber 6, and the chamber member 7 as shown in FIG. 1.

The bumper cover 3 is provided at a front end of the vehicle and extends in a vehicle width direction or a transverse direction of the vehicle, for example. The bumper cover 3 is made of a resin, such as polypropylene, and is attached to a body of the vehicle to cover the bumper reinforcement 4, the absorber 6, and the chamber member 7.

The bumper reinforcement 4 is a metal beam member that is provided inside the bumper cover 3 and that extends in the vehicle width direction.

The side members 5 are metal members that makes a pair with each other. The side members 5 are located adjacent to both left and right side faces of the vehicle and extend in a vehicle fore-and-aft direction or a longitudinal direction of the vehicle. The bumper reinforcement 4 is mounted at the front end of the side members 5.

The absorber 6 is made of a foamed resin and extends in the vehicle width direction. The absorber 6 is provided inside the bumper cover 3 and is mounted to be disposed at a lower side portion of a front surface 4a of the bumper reinforcement 4. The absorber 6 functions to absorb the force applied to the vehicle bumper 2.

The chamber member 7 is made of a synthetic resin and that has a substantial box shape extending in the vehicle width direction. The chamber member 7 is provided inside the bumper cover 3 and is mounted to be disposed at an upper side portion of the front surface 4a of the bumper reinforcement 4. The chamber member 7 defines a chamber space 7a by wall surfaces having several millimeters in thickness, and the chamber space 7a is configured to be substantially air tight. The chamber member 7 functions to absorb the force or the impact in the vehicle bumper 2 and also functions to transmit pressure.

The vehicle bumper 2 includes a compressive-deformation region C (a region surrounded by a dashed and single-dotted line shown in FIGS. 1 and 2) therein. The compressive-deformation region C is defined by projecting the front surface 4a of the bumper reinforcement 4 frontward into the space adjacent to the front surface 4a. The chamber member 7 includes a deformable part 7b and a non-deformable part 7c that extend in the vehicle width direction. Specifically, the deformable part 7b is located in the compressive-deformation region C. Also, the non-deformable part 7c is located outside the compressive-deformation region C and is located above an upper end of the bumper reinforcement 4. In other words, the non-deformable part 7c is located within an area surrounded by a dashed line shown in FIG. 2 and projects relative to the bumper reinforcement 4 along a vertical axis of the vehicle. Also, the non-deformable part 7c extends to be located above an upper surface 4b of the bumper reinforcement 4, which surface 4b is located on a vehicle rear side of the front surface 4a of the bumper reinforcement 4. In other words, the upper surface 4b is located on an opposite side of the front surface 4a opposite from the bumper cover 3.

The pressure sensor 8 is capable of sensing pressure of air, and is assembled to the chamber member 7 such that the pressure sensor 8 is configured to sense change of pressure in the chamber space 7a. Note that, the pressure sensor 8 is attached to the non-deformable part 7c of the chamber member 7 for sensing a change of pressure in the chamber space 7a of the non-deformable part 7c. The pressure sensor 8 outputs an analog voltage signal in proportion to the pressure, and transmits the signal to the pedestrian protection apparatus ECU 10 through a signal wire 10a.

The pedestrian protection apparatus ECU 10 executes an inflation control for inflating an air bag (not shown) for protecting a pedestrian and is configured to receive the signal outputted from the pressure sensor 8 through the signal wire 10a. The pedestrian protection apparatus ECU 10 executes a process for determining whether a pedestrian or a human body collides with the vehicle bumper 2 based on the pressure detection result by the pressure sensor 8. Note that, in addition to the pressure detection result by the pressure sensor 8, a vehicle speed detection result from a speed sensor (not shown) may be inputted into the pedestrian protection apparatus ECU 10 such that the pedestrian protection apparatus ECU 10 determines the pedestrian collision based on the pressure detection result and the vehicle speed detection result, for example.

Figure 3:
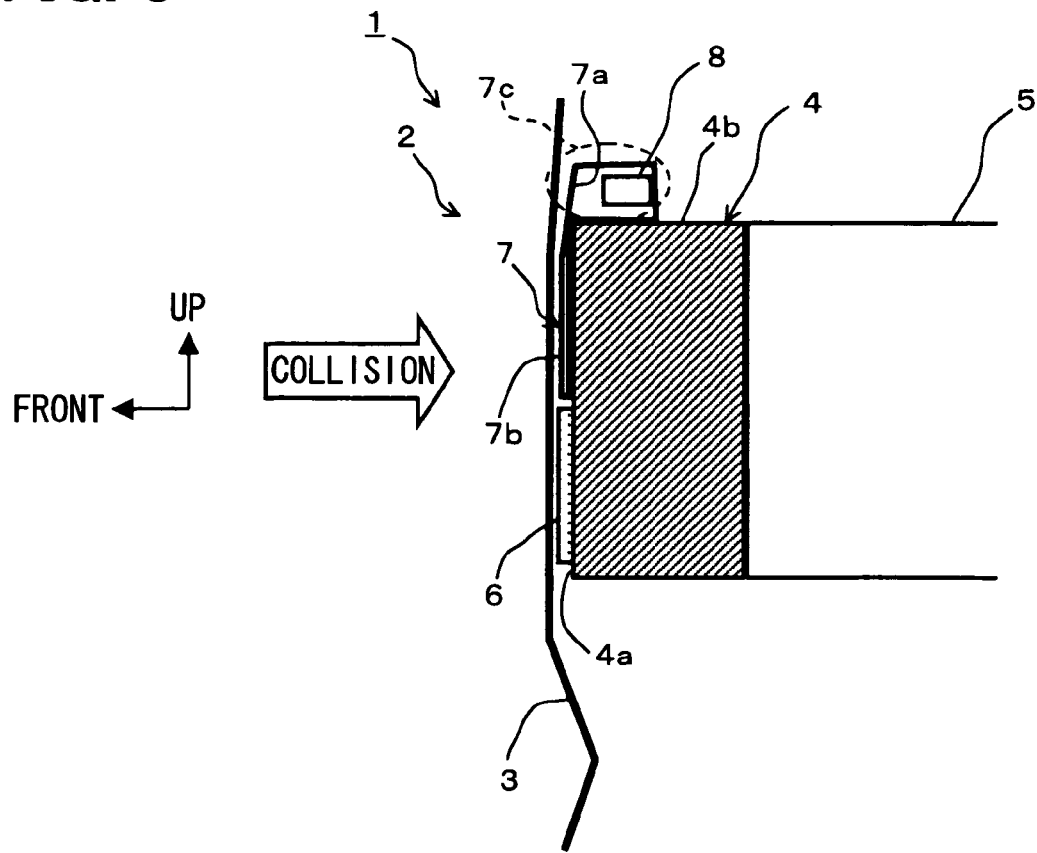
FIG. 3 is a side view illustrating a situation, where a deformable part of a chamber member is compressed to be deformed due to the collision of the object with the vehicle bumper.
Figure 4:
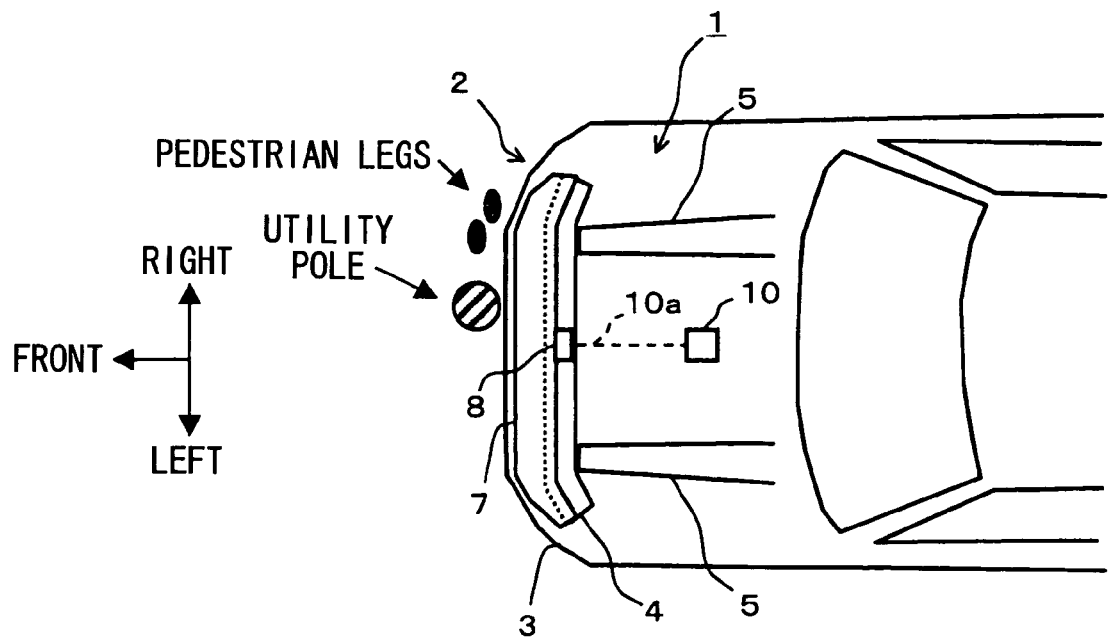
FIG. 4 is a plan view illustrating a situation, where a pedestrian and a utility pole simultaneously collide with the vehicle bumper.

Next, the operation of each component of the above vehicular collision detection apparatus 1 is described as an example of a case, where the pedestrian collides with the vehicle bumper 2. FIG. 3 is a side view illustrating a situation, in which the deformable part 7b of the chamber member 7 is compressed to be deformed due to collision of the object with the vehicle bumper 2. FIG. 4 is a plan view illustrating an example, in which a pedestrian and a utility pole simultaneously collide with the vehicle bumper 2.

The vehicle bumper 2 is configured as shown in FIGS. 1 and 2 before the pedestrian collides with vehicle bumper 2. When the pedestrian collides with the vehicle bumper 2, the absorber 6 is pressed against the front surface 4a of the bumper reinforcement 4, and thereby being compressed to be deformed as shown in FIG. 3. Also, the deformable part 7b of the chamber member 7, which part 7b is located inside the compressive-deformation region C, is pressed against the front surface 4a of the bumper reinforcement 4, and thereby being compressed to be deformed similar to the absorber 6. As a result, a part of the chamber space 7a, which part corresponds to the collision, completely collapses. In contrast, the non-deformable part 7c of the chamber member 7, which part 7c is located outside the compressive-deformation region C, is not pressed against the front surface 4a of the bumper reinforcement 4 because the bumper reinforcement 4 is not located in an adjacent space on a vehicle rearward side of the non-deformable part 7c. As a result, another part of the chamber space 7a, which part corresponds to the non-deformable part 7c, does not collapse. Specifically, because the non-deformable part 7c extends above the upper surface 4b of the bumper reinforcement 4, which surface 4b is provided on the vehicle rearward side of the front surface 4a of the bumper reinforcement 4, the chamber space 7a is enabled to reliably retain its shape.

Therefore, for example, as shown in FIG. 4, in the vehicle bumper 2, in a case, where the utility pole collides with the vehicle bumper 2 at a utility pole collision position located between a pedestrian collision position and the pressure sensor 8 mounted on the chamber member 7, the chamber space 7a of the deformable part 7b at the utility pole collision position may completely collapse. However, the chamber space 7a of the non-deformable part 7c is limited from collapsing, and thereby the chamber space 7a is limited from being divided into two spaces in the vehicle width direction relative to the utility pole collision position.

Then, in the chamber member 7, the pressure sensor 8 mounted in the non-deformable part 7c senses change of the pressure in the chamber space 7a and outputs the analog voltage signal in proportional to the pressure. Then, the pressure sensor 8 transmits the signal to the pedestrian protection apparatus ECU 10 through the signal wire 10a. The pedestrian protection apparatus ECU 10 executes a process for determining whether a pedestrian or a human body collides with the vehicle bumper 2 based on the pressure detection result received through the signal wire 10a. When the pedestrian protection apparatus ECU 10 detects the pedestrian collision, a pedestrian protection apparatus (not shown) is enabled to be activated.

As is apparent from the above, according to the vehicular collision detection apparatus 1 of the present embodiment, the chamber member 7 is provided in the vehicle bumper 2 at the front surface 4a of the bumper reinforcement 4 and defines the chamber space 7a therein. The chamber member 7 includes the deformable part 7b and the non-deformable part 7c that extend in the vehicle width direction. The deformable part 7b and the non-deformable part 7c integrally define the chamber space 7a. The deformable part 7b is compressed to be deformed between the collision object and the bumper reinforcement 4 in a case, where the collision occurs to the vehicle bumper 2. The non-deformable part 7c is not compressed to be deformed between the collision object and the bumper reinforcement 4. Even in a case, where the deformable part 7b is compressed to be deformed and thereby a part of the deformable part 7b completely collapses due to the collision of the object, such as a pedestrian, with the vehicle bumper 2, the non-deformable part 7c is limited from being compressed to be deformed. As a result, the division of the chamber space 7a in the vehicle width direction is limited. Thus, even when collisions simultaneously occur at multiple positions on the vehicle bumper 2, the pressure sensor 8 is capable of reliably sensing the change of the pressure in the chamber space 7a. Thus, the pedestrian protection apparatus ECU 10 serving as collision detecting means is capable of accurately detecting the collision of the pedestrian with the vehicle bumper 2 based on the detection result by the pressure sensor 8.

Also, the non-deformable part 7c corresponds to a part of the chamber member 7, which part extends above the upper end of the bumper reinforcement 4, and which part is located outside the compressive-deformation region C. As a result, in the above configuration of the present embodiment, in which the absorber 6 made of the foamed resin is provided below the chamber member 7, the non-deformable part 7c is easily and reliably provided.

Also, the non-deformable part 7c extends above the upper end of the bumper reinforcement 4 and is located on the vehicle rearward side of the front surface 4a of the bumper reinforcement 4. As a result, in a case, where the object, such as a pedestrian, collides with the vehicle bumper 2, the chamber space 7a corresponding to the non-deformable part 7c is enabled to reliably retain the shape.

Furthermore, the pressure sensor 8 is attached to the non-deformable part 7c of the chamber member 7. In the above configuration, the non-deformable part 7c is not compressed to be deformed between the collision object and the bumper reinforcement 4. As a result, even when the deformable part 7b is compressed to be deformed due to the collision of the pedestrian with the vehicle bumper 2, and thereby the part of the deformable part 7b completely collapses, the change of the pressure in the chamber space 7a is reliably detected.

Note that, the present invention is not limited to the above embodiment, and may be modified in various manners within the spirit and scope of the present invention.

For example, in the above embodiment, the non-deformable part 7c corresponds to a part of the chamber member 7, which part extends to be located above the upper end of the bumper reinforcement 4, and which part is located outside the compressive-deformation region C. However, in another configuration that solely includes the chamber member 7 for absorbing the force without having the foamed-resin absorber 6 below the chamber member 7, the non-deformable part 7c may correspond to a part of the chamber member 7, which part extends to be located below a lower end of the bumper reinforcement 4, and which is located outside the compressive-deformation region C.

Figure 5:
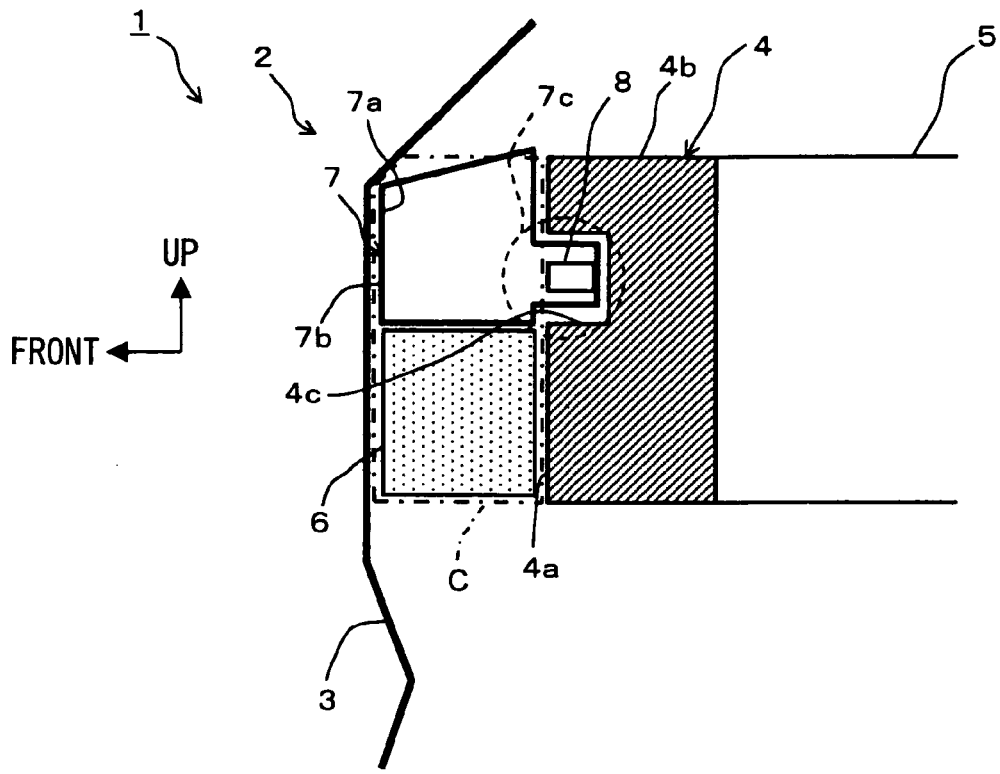
FIG. 5 is a side view illustrating the inside of the vehicle bumper that is provided with a vehicular collision detection apparatus of a first modification of the present invention.

As a first modification shown in FIG. 5, a recess 4c may be provided and open at the front surface 4a of the bumper reinforcement 4. In the above configuration, the non-deformable part 7c may correspond to a part of the chamber member 7, which part extends to be received by the recess 4c of the bumper reinforcement 4. In the present modification, even when the deformable part 7b in the compressive-deformation region C is compressed to be deformed due to the collision of the pedestrian with the vehicle bumper 2, the non-deformable part 7c located outside the compressive-deformation region C is not compressed to be deformed, and thereby the chamber space 7a is limited from being divided into multiple parts arranged in the vehicle width direction. In other words, the communication of air in the chamber member 7 in the width direction is limited from being disabled.

Figure 6:
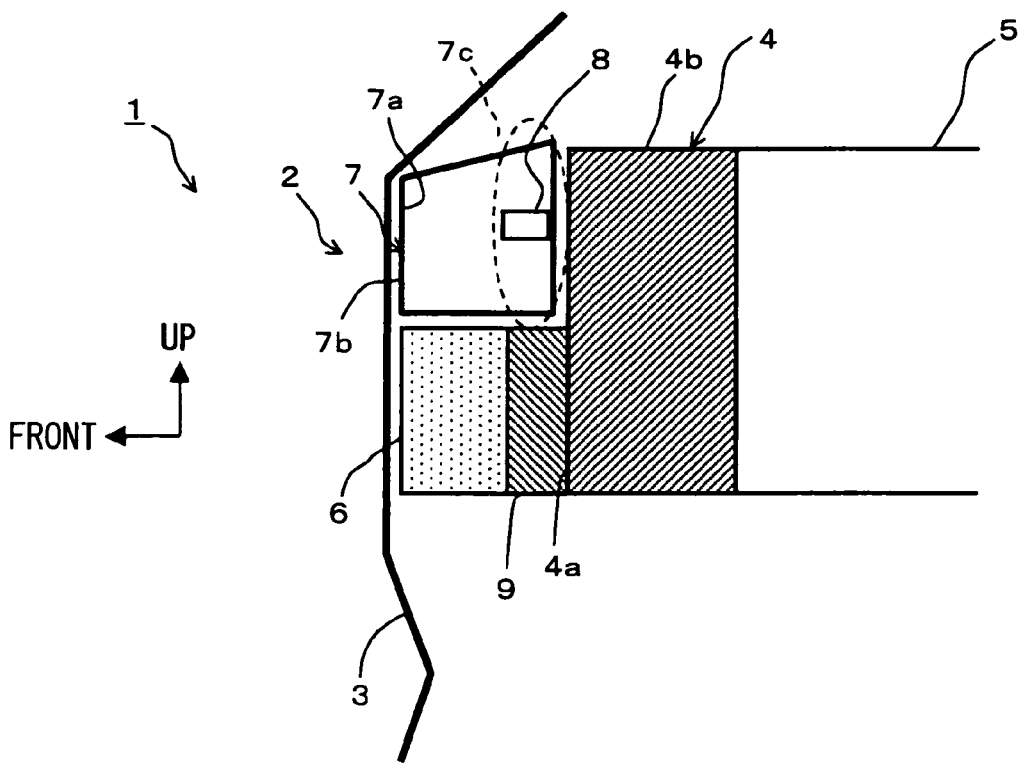
FIG. 6 is a side view illustrating an inside of the vehicle bumper that is provided with a vehicular collision detection apparatus of a second modification of the present invention.

Also, as a second modification shown in FIG. 6, a rigid member 9 may be provided to the front surface 4a of the bumper reinforcement 4 on a lower side of the chamber member 7. In other words, the rigid member 9 is provided between the bumper cover 3 and the front surface 4a of the bumper reinforcement 4 along the longitudinal axis of the vehicle, and the rigid member 9 may be disposed on a side of the non-deformable part 7c along the vertical axis of the vehicle. The rigid member 9 is disposed adjacent to the chamber member 7 and has a length in the vehicle fore-and-aft direction shorter than a length of the chamber member 7.

In the above configuration, the deformable part 7b corresponds to a part of the chamber member 7, which part is located on a vehicle frontward side of the rigid member 9, and the non-deformable part 7c corresponds to the other part of the chamber member 7, which part is located on a side of the rigid member 9 in a direction perpendicular to the vehicle fore-and-aft direction. As a result, the non-deformable part 7c may correspond to the part of the chamber member 7, which part is spaced away from the rigid member 9 in the vertical direction of the vehicle, for example.

Note that in the present modification, the vehicle frontward side is a left side in FIG. 6 or a frontward side of the vehicle, and the direction perpendicular to the vehicle fore-and-aft direction is an upward side in FIG. 6 or an upper side in a vertical axis of the vehicle. Also note that, the rigid member 9 may be made of a metal similar to a material of the bumper reinforcement 4, for example.

According to the present modification, the deformable part 7b corresponds to a part of the chamber member 7, which part is located on the vehicle frontward side of the rigid member 9. As a result, when a pedestrian collides with the vehicle bumper 2, the deformable part 7b is compressed and deformed such that the pressure in the chamber space 7a certainly changes. Also, the non-deformable part 7c corresponds to the part of the chamber member 7, which part is located at the side of the rigid member 9 in the direction perpendicular to the vehicle fore-and-aft direction. As a result, even when the deformable part 7b is compressed and deformed due to the collision of the pedestrian with the vehicle bumper, and thereby the part of the deformable part 7b completely collapses, the non-deformable part 7c is limited from being compressed to be deformed. As a result, the chamber space 7a is limited from being divided in the vehicle width direction.

As above, in the present embodiment of the present invention, the vehicular collision detection apparatus is capable of detecting the collision of a pedestrian with a vehicle through the chamber member used for detecting the pressure even when the collisions occur at multiple positions of the vehicle bumper.

Additional advantages and modifications will readily occur to those skilled in the art. The invention in its broader terms is therefore not limited to the specific details, representative apparatus, and illustrative examples shown and described.

What is claimed is:

1. A collision detection apparatus for a vehicle having a vehicle bumper, which includes a bumper reinforcement, the collision detection apparatus comprising:
   a chamber member that is provided inside the vehicle bumper at a front surface of the bumper reinforcement, the chamber member having a chamber space therein;
   a pressure sensor that is configured to sense change of pressure in the chamber space; and
   collision detecting means for detecting collision of a collision object with the vehicle bumper based on a detection result by the pressure sensor, wherein:
   the chamber member includes a deformable part and a non-deformable part, each of which extends in a vehicle width direction;
   the deformable part and the non-deformable part integrally define the chamber space;
   the deformable part is compressed to be deformed between the collision object and the bumper reinforcement in a case, where the collision object collides with the vehicle bumper; and
   the non-deformable part is limited from being compressed to be deformed between the collision object and the bumper reinforcement.

2. The collision detection apparatus according to claim 1, wherein:
   the vehicle bumper has a compressive-deformation region therein, the compressive-deformation region being defined by projecting the front surface of the bumper reinforcement frontward of the vehicle into a space adjacent to the front surface;
   the deformable part corresponds to a part of the chamber member, which part is located in the compressive-deformation region; and
   the non-deformable part corresponds to an other part of the chamber member, which part is located outside the compressive-deformation region.

3. The collision detection apparatus according to claim 2, wherein the non-deformable part extends to be located above an upper end of the bumper reinforcement.

4. The collision detection apparatus according to claim 2, wherein the non-deformable part extends to be located below a lower end of the bumper reinforcement.

5. The collision detection apparatus according to claim 2, wherein the non-deformable part extends to be located on a vehicle rearward side of the front surface of the bumper reinforcement.

6. The collision detection apparatus according to claim 2, wherein:
   the bumper reinforcement includes a recess that is provided on the front surface; and
   the non-deformable part extends to be received by the recess of the bumper reinforcement.

7. The collision detection apparatus according to claim 1, further comprising:
   a rigid member that is provided at the front surface of the bumper reinforcement adjacently to the chamber member, wherein:
   the deformable part corresponds to a part of the chamber member, which part is located on a vehicle frontward side of the rigid member; and
   the non-deformable part corresponds to an other part of the chamber member, which part is located on a side of the rigid member in a direction perpendicular to a vehicle fore-and-aft direction.

8. The collision detection apparatus according to claim 1, wherein the pressure sensor is attached to the non-deformable part of the chamber member.

9. A collision detection apparatus for detecting collision of a collision object with a vehicle having a bumper cover and a bumper reinforcement, the collision detection apparatus comprising:
   a chamber member that is provided between the bumper cover and the bumper reinforcement along a longitudinal axis of the vehicle;
   a pressure sensor that is configured to sense pressure in the chamber member; and
   a collision detecting device that detects collision of the collision object with the bumper cover based on the pressure sensed by the pressure sensor, wherein:
   the chamber member includes a deformable part and a non-deformable part, each of which extends along a transverse axis of the vehicle;
   the deformable part is deformable along the longitudinal axis; and
   the non-deformable part is limited from being deformed along the longitudinal axis.

10. The collision detection apparatus according to claim 9, wherein:
    the non-deformable part extends generally along a vertical axis of the vehicle such that the non-deformable part projects relative to the bumper reinforcement along the vertical axis.

11. The collision detection apparatus according to claim 9, wherein:
    the bumper reinforcement has a surface that faces in a first direction toward the chamber member, the surface having a recess thereon; and
    the non-deformable part extends in a second direction opposite to the first direction such that the non-deformable part is received by the recess.

12. The collision detection apparatus according to claim 9, further comprising:
   a rigid member that is provided between the bumper cover and the bumper reinforcement along the longitudinal axis, wherein:
   the rigid member is configured to be limited from being deformed; and
   the rigid member is disposed on a side of the non-deformable part along a vertical axis of the vehicle.

13. The collision detection apparatus according to claim 9, wherein:
   the bumper reinforcement has a surface that faces in a direction toward the bumper cover; and
   the deformable part is positioned in a compressive-deformation region defined by projecting the surface in the direction onto a space adjacent to the surface.

* * * * *